Feb. 6, 1968  J. A. TYLLE  3,367,051
POWER ANIMATED ORNAMENT
Filed June 22, 1965  3 Sheets-Sheet 1
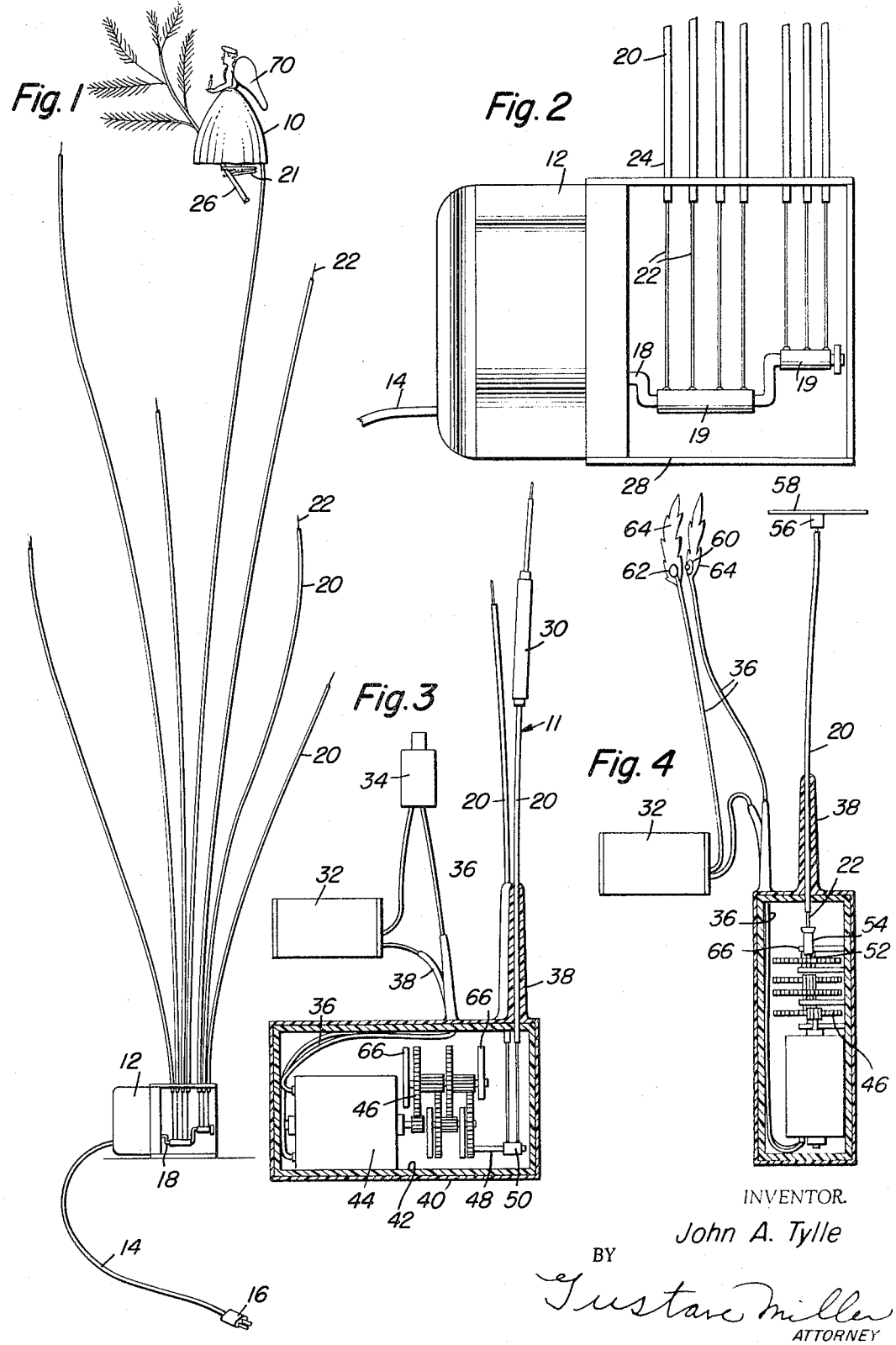
INVENTOR.
John A. Tylle
BY
Gustave Miller
ATTORNEY

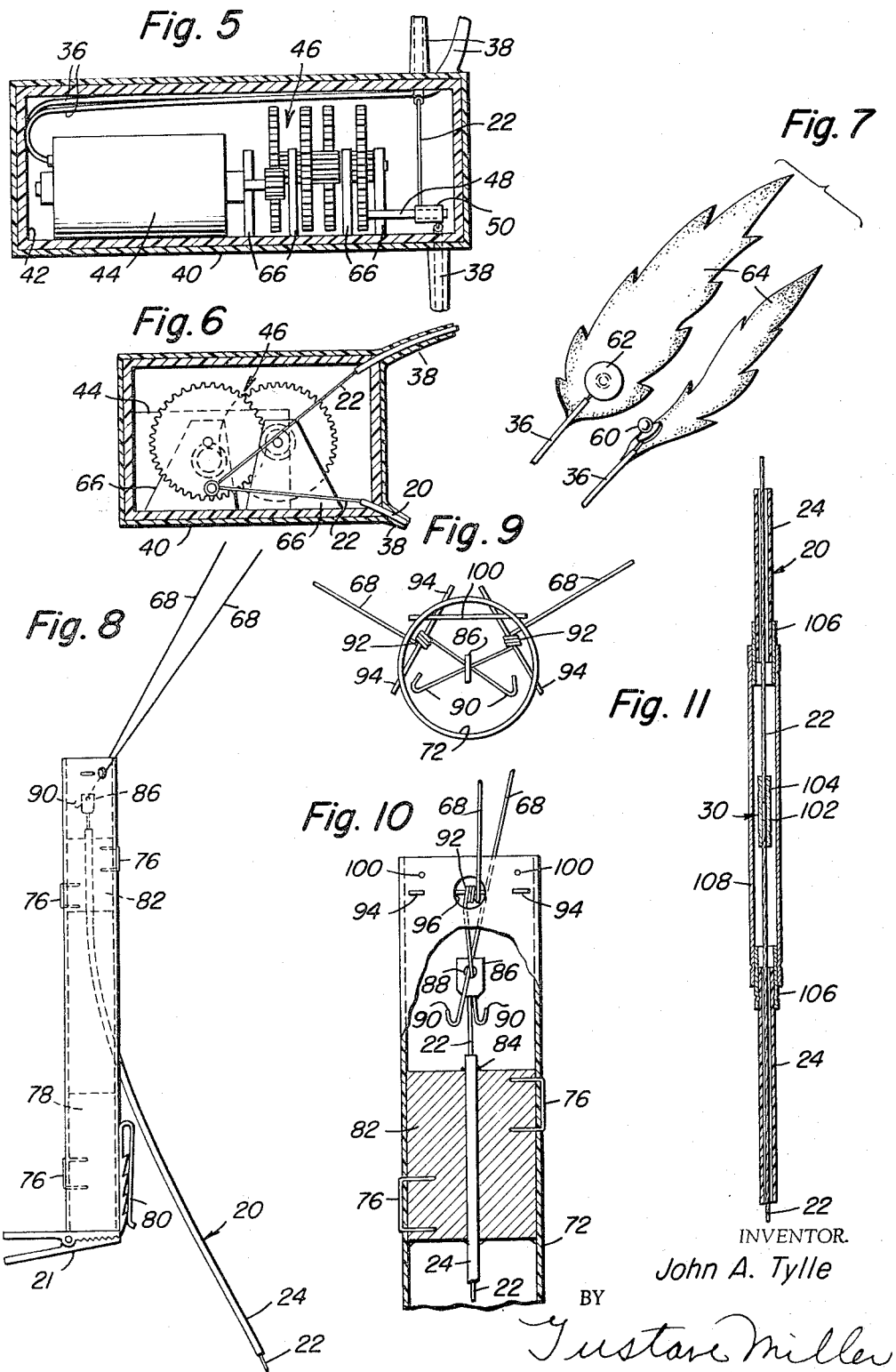

Feb. 6, 1968 J. A. TYLLE 3,367,051
POWER ANIMATED ORNAMENT
Filed June 22, 1965 3 Sheets-Sheet 3

INVENTOR.
John A. Tylle
BY
Gustave Miller
ATTORNEY

United States Patent Office 3,367,051
Patented Feb. 6, 1968

3,367,051
POWER ANIMATED ORNAMENT
John A. Tylle, E. 8th St., Columbus, Nebr. 68601
Filed June 22, 1965, Ser. No. 466,038
4 Claims. (Cl. 40—106.32)

ABSTRACT OF THE DISCLOSURE

This invention is a power animated ornament, such as may be used on a tree, cake, floral arrangement or the like, which is inexpensive to construct and operate. The ornament has a pair of flapping wings, the power means includes an electrical motor and an electrical power supply thereto, with a Bowden cable for transmitting motion from the motor to the ornament, the ornament body including a power transmission means which connects the reciprocating cable within the Bowden wire to a pair of cables, one for each wing, to reciprocate such pair of cables and thus flap the wings.

---

This invention relates to a power animated ornament, and has for an object to provide an improved power animated ornament, which may be in various forms, and to an improved means for animating the ornament or a part or parts thereof, in either a reciprocating or in a rotating manner.

A further object of this invention is to provide an ornament which is animated by a small electric motor, with substantially frictionless transmission means for transmitting the power from the electric motor to the ornament, thereby utilizing an inexpensive throw-away very low power motor, battery operated, or a low power motor connected to any conventional source of electricity, such as a house outlet or 110 volt supply.

A further object of this invention is to provide an improved power transmission means including a smooth inner surfaced plastic tube, preferably of nylon, and a power transmitting wire therewithin, of brass plated high carbon springy steel strand.

Still a further object of this invention is to provide a disposable or throw-away electric motor and power supply which is water tight, so that it may be hidden from view in a water supply to a flower arrangement or to a Christmas tree, where the ornament is in the form of an addition to a flower, or is a Christmas tree decoration, and wherein, in the battery form of power supply, the battery as well as the electric motor are both water tight and are disposable when the battery is exhausted.

Still a further object of this invention is to provide an inexpensive switch for the battery operated electric motor in the form of a snap fastener as providing the contacts, with the fastener elements mounted on pieces of artificial shrubbery, resembling the material in the location where it is to be used.

Still a further object of this invention is to provide a very inexpensive transmission unit for converting the reciprocation of the single reciprocating power wire to a pair of power wires of a material such as used as an "E" or first guitar string, for providing flapping motion to a pair of wings of the animated ornament, such ornament being mounted on a housing for such transmission means.

Still a further object of this invention is to provide a splicing means for the power transmitting wire and plastic tubing so that the distance between the power motor and the ornament may be adjusted as desired.

Still a further object of this invention is to provide, in the power transmission means, a plurality of power transmitting tubes and wires, with the wires in different stages of push and pull at least part of the time relative to each other.

Yet a further object of this invention is to provide a substantially noiseless inexpensive electric motor using plastic gear train and enclosed in a water tight housing which may be submerged to still further reduce or eliminate any slight noise that may still be present.

Still a further object of this invention is to provide an inexpensive disposable animated ornament or display figure and an electric motor connected thereto, wherein the ornament may be a floral decoration, a Christmas decoration such as an angel with flapping wings, a butterfly, a bumble bee, a wedding bell, a Christmas bell, an anniversary decoration, a jack-in-the-box, etc., too numerous to specify, which may be mounted on a floral arrangement, a tree, or wherever desired.

In brief, this invention is comparatively inexpensive; a throwaway, disposable animated ornament and low power electric motor and battery combination, as well as an animated ornament and low power electric motor powered from conventional house electric current, together with a power transmission means between the motor and the movable parts on the ornament consisting of a sleeve or sheath and an internal cable or wire having a substantially frictionless movement within the sleeve, the sleeve being preferably of nylon while the wire is a rigid but springy wire which may be high carbon brass plated steel strand. In addition, a housing forming part of the body of the ornament may contain as a skeleton a transmission unit for causing a single power cable to simultaneously operate a pair of ornament movable elements, such as flapping wings.

The same type of power cable is used both in push-pull or rotary transmisison of power, and an inexpensive splicing arrangement is provided for lengthening the power cable to any desired length. With the substantially friction-free power cable, the cable may be curved as necessary and the throwaway motor and battery are in a water tight casing for being placed to operate in water with a floral arrangement.

With the above and related objects in view, this invention consists in the details of construction and combination of parts, as will be more fully understood from the following description, when read in conjunction with the accompanying drawing, in which:

FIG. 1 is an elevational view of one form of the invention.

FIG. 2 is an elevational view of the motor of FIG. 1, on an enlarged scale.

FIG. 3 is a partly elevational and partly sectional view of the push-pull battery operated form of this invention.

FIG. 4 is a similar view which shows adaption of the revolving principle in the battery form.

FIG. 5 is a view of a reduction gear type of operation.

FIG. 6 is an end view, partly broken away, of FIG. 5.

FIG. 7 is a view of a simple switch in the form of two artificial leaves and a snap fastener which will open and close the circuit.

FIG. 8 is a view of a push-pull transmission unit and housing.

FIG. 9 is a top plan view of FIG. 8.

FIG. 10 is an enlarged, partly sectional, side elevational view of the upper end part of the push-pull unit of FIG. 8.

FIG. 11 is an enlarged sectional view of cable splice, on line 11—11 of FIG. 3.

Figure 12:
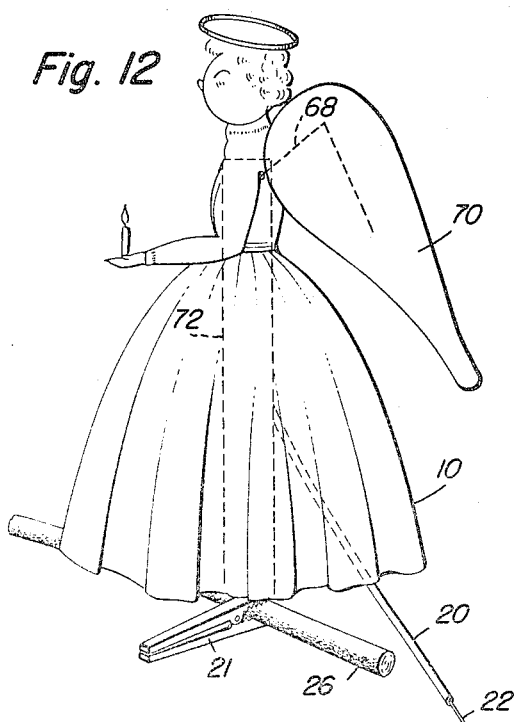
FIG. 12 is an enlarged perspective view of the fluttering wing Christmas tree angle of FIG. 1.
Figure 14:
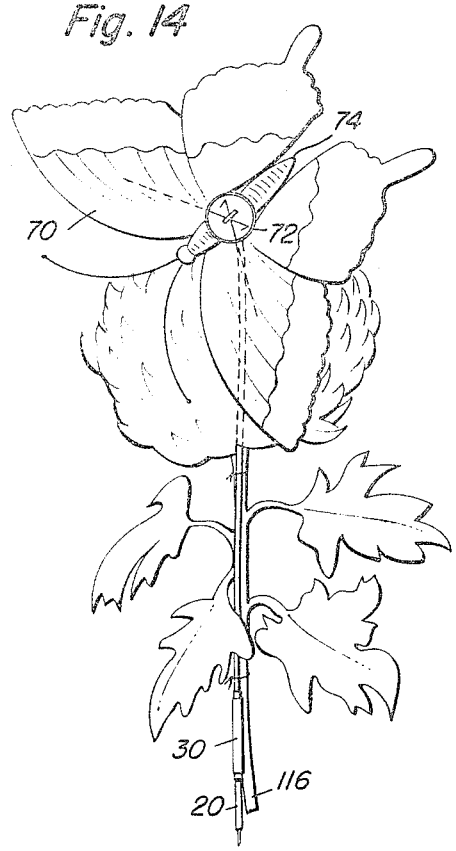
FIG. 14 shows a push-pull unit operating a floral ornament in the form of a butterfly.

One form of power supply for the animated ornament 10 of this invention is a small, quiet synchronous 110 volt 5 watt electric motor 12 connected by a power conduit 14 terminating in a jack 16 for plugging into any suitable power receptacle. This motor 12 of FIGS. 1 and 2 has a crank shaft 18 geared thereto by a suitable reduction gearing, such as later described in connection with FIGS. 3 and 4, or 5 and 6, within the same housing as the motor 12, and terminating in the crank shaft 18.

On the crank shaft there are mounted a pair of rotatable sleeves 19 to which are secured the power transmission cables 20, forming a power transmission complex, providing mechanical power for a number of ornaments, there being seven cables 20 here shown. On one of these mechanical power cables 20 is a Christmas tree angle provided with a base clamp 21 by which it is mounted on a branch 26 of a Christmas tree.

The mechanical power cable 20, in all forms of this invention, consists of a brass plated springy steel strand 22, which slidably or rotatably extends through a sleeve or sheath 24, of nylon, or other very smooth plastic, so that the steel strand 22 has a substantially frictionless movement within the sleeve 24, whether the movement be rotary or reciprocable. Also, due to the particular type of wire 22 and sleeve 24, the cable 20 may be curved, in reasonable degree, in any direction away from the power source and still provide a substantially frictionless movement of the wire 22 within the sleeve 24.

At the motor end, each steel wire strand is suitably secured to a crank sleeve 19, as by soldering, when the crank sleeve 19 is of brass or solder, or by any suitable means depending on the composition of the crank sleeve 19, which composition may also be a suitable plastic about which the steel strand wire 22 may be suitably secured, as soldering or tying, or soldering after being tied.

The synchronous motor 12, the gearing and the crank shaft 18 with its crank sleeves 19 are all enclosed within a casing 28 through one end of which the electric conduit 14 extends. The casing 28 is made of any suitable material through which each mechanical power cable sleeve 24 extends in connection thereto.

As shown, there are seven cables 20 connected to the crank shaft sleeves 19 on crank shaft 18 of motor 12, so up to seven different ornaments may be powered from this motor 12. As thus provided, it may be used for powering a number of Christmas ornaments or a number of varied ornaments, and may be used and reused time and again. The cables 20 may be lengthened as needed, or connected to a different animated ornament, by means of a splice 30 shown and later described in FIG. 11, and the particular detail of the animated angel 10 is also later described.

Less expensive throwaway types of motor, power supply and even ornaments, are shown in FIGS. 3 to 6 inclusive. The motors and electric batteries are commercially available on the market, but the particular assemblies, as claimed, are novel. In FIG. 3, a low-cost, water tight enclosed long-life flashlight battery 32 is shown as connected by a push switch 34 and water tight electric conduits 36 through suitable water tight nipples 38 integrally formed at the same time along with a water tight plastic coating 40 about the housing 42 within which the low cost throwaway motor 44 is supported and enclosed, along with a reduction gear train 46 of suitable plastic such as hard rubber, nylon, or the like, which will be inherently quiet and substantially frictionless so as to provide a maximum of operation for the battery 32, the final gear in train 46 rotating at preferably about 15 r.p.m.

In FIG. 3, the gear train 46 terminates in an eccentric or crank shaft 48 mounted thereon near its circumference, and mounted on this eccentric crank shaft 48 is a crank sleeve 50 to which is secured two wire strand steel wires 22 each extending through one of two somewhat spaced apart nipples 38, so that the cables 22 thereon will reciprocate at slightly different periods, and thus cause the ornaments, not shown, connected thereto to operate at the same slightly different periods.

The construction of FIG. 4 is similar to FIG. 3, except that the final gear of the gear train 46 is provided with a concentric shaft 52 to which a wire strand wire 22 of one cable 20 is suitably secured as by a brass or lead sleeve 54 crimped thereto and to the shaft 52. A similar brass or lead sleeve 56 is also crimped or secured to the other end of the wire 22 and is soldered to the bottom of a brass platform 58 on which any suitable ornament is supported for rotation. Instead of the switch 34 used in FIG. 3, a pair of male and female snap fasteners 60 and 62 mounted on artificial insulating leaves or other flora elements 64 as more particularly shown in FIG. 7, and serve for completing the circuit from battery 32 to motor 46 in FIG. 4.

Except for a difference in size of the drawing of the motor 44 and gear train 46, the construction in FIGS. 5 and 6 is the same as in FIG. 3, but stanchion 66 providing bearing supports for the gear train shafts are here more clearly visible, the bearing stanchions 66 being supported on the inside of the housing 42. The motors 44, in each form, are commercially available, often encased in a square or rectangular case.

In FIGS. 8, 9 and 10 there is shown the details of the push-pull unit and housing for transmitting the push-pull movement of the wire 22 of a single cable 20 to a pair of wires 68 for simultaneously operating a pair of ornament elements, such as angel wings 70. The unit housing 72 also acts as a skeleton for the angel 10, for a butterfly 74, or for any other animated ornament having a pair of wings or similar movable elements. The housing unit 72 is a plastic cylinder in the bottom of which a staple 76 acts to fasten a wood plug 78 to the bottom of which the base clamp 21 is secured, and to the side of which a mounting clip 80 is secured, so that the ornament may be mounted in two different ways.

The cable 20 extends through a hole in the side of the unit plastic cylinder 72 between the bottom plug 78 and an upper plug 82 located somewhat below the top of the unit housing cylinder 72 and similarly secured by staples 76. The cable sleeve 24 is secured axially through upper plug 82 as by plastic cement 84, and the wire 22 therethrough has a brass eyelet 86 soldered or otherwise secured to its end, the eyelet 86 having an eye or opening 88 through which extends the hooked ends 90 of the wing flapping wires 68, each wire 68 being first coiled at 92 up about a pin 94 supported eccentrically in unit cylinder 72, holes 96 of suitable size being provided for the movement of the wires 68 through the sides of the unit cylinder 72. A reinforcing pin 100 helps to hold the unit cylinder 72 in rigid position against the pressure of the coil pins 94. As will be apparent, reciprocatory movement of wire 22 and thus of eyelet 86 will cause the hooked ends 90 of wires 68 to reciprocate toward and from each other, pivoting the wires 68 about their hinge coils 92 and thus flap the wings 70 attached thereto at their other ends.

In FIG. 11, there is shown the details of the splice 30 for cables 20, which may be used anywhere desired. The splice 30 consists of brass or nylon sleeves which telescope as needed. Adjoining ends of wire 22 are secured by a brass or soft lead sleeve 102 telescoped thereover and soldered or crimped thereto at 104. A brass, nylon or plastic sleeve 106 is soldered, plastic cemented or crimped over spaced ends of cable sleeve 24, and then a larger nylon or brass sleeve 108 is secured to both brass, nylon or plastic sleeves 106 over the wire sleeve 102, so that the joint provided by the wire joining sleeve 102 may rotate or reciprocate freely therewithin.

Figure 13:
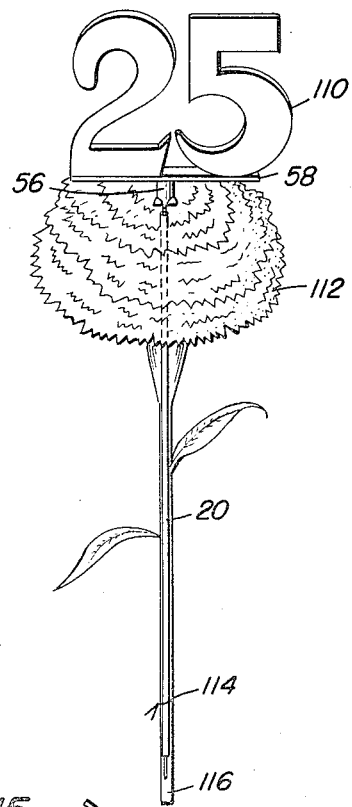
FIG. 13 is a view of a revolving floral ornament, to be used in flower bouquets and arrangements.

In FIG. 13, the ornament consists of a numeral 110, such as an anniversary number "25," mounted on the platform 58 on a wire 22 secured at 55 by the support 58 through a flower 112, the cable 20 being tied at 114 to the flower stem 116. The butterfly 74 is similarly mounted on a flower stem 116.

Figure 15:
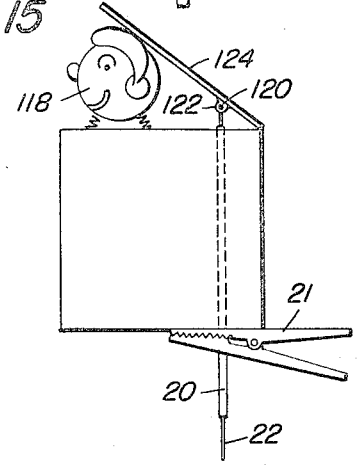
FIG. 15 is a view of a jack-in-the-box tree ornament.

In FIG. 15, a "jack-in-the-box" 118 is mounted on a clamp 21 and the wire 22 of cable 20 extending up through the box bottom is secured to a pivot pin 120 of a pair of ears 122 mounted on the bottom of the box cover 124 so that the cover 124 may be raised and lowered to permit the "Jack" 118 to pop up and down.

Obviously, any type of animatable ornament may be used to depict any type of character or form, many reminiscent of various holidays and also for special, private and personal events throughout the year. The operating motor and battery and cable may be hidden by the florist or operator along flower stems and in the floral base, within water, the parts being water tight and relatively silent, so that the desired movement takes place without visible cause.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. For use as an ornament to be fixedly secured on a tree, cake, floral arrangement or the like, the improvement comprising a power animated ornament, said ornament comprising a body, means on said body for fixedly securing it in operative position, a movable element movably secured on said body, a power means for moving said movable element means relative to said body, a power means casing, and power transmission means from said power means to said movable element means including a flexible but relatively stiff plastic sleeve means secured at one end to said power casing and extending to and secured at its other end to said ornament body, a relatively stiff but flexible springy steel wire means extending through said plastic sleeve means and secured at one end to said movable element means, and means securing its other end to said power means, said wire means transmitting motion from said power means to said movable element means, said ornament body including a hollow cylindrical rigid housing, the ornament end of said flexible plastic sleeve means being anchored within said housing, an eye member secured within said rigid housing to the end of said wire means, a pair of smooth springy wires each secured at one end to a movable element of said movable element means and eccentrically, hingedly mounted within said cylindrical rigid housing and integrally extending through said eye member from opposite sides and then terminating in hooked ends, whereby reciprocatory movement of said power means connected wire means causes flapping movement of said pair of ornament body movable elements.

2. The ornament of claim 1, said ornament body flapping elements comprising a pair of wings.

3. The ornament of claim 2, said housing providing a skeleton for said ornament body.

4. The ornament of claim 1, and means for hingedly mounting said pair of flapping wires comprising a pair of hinge pivots eccentrically mounted in said housing, said flapping wires being coiled upwardly about said hinge pivots, said hooked ends extending from said coiled portions through said eye member.

References Cited
UNITED STATES PATENTS

| | | | |
|---|---|---|---|
| 1,357,706 | 11/1920 | Halpern et al. | 40—106.34 X |
| 1,680,982 | 8/1928 | Goerk et al. | 40—106.3 |
| 1,927,861 | 9/1933 | Wypy | 46—139 X |
| 2,641,867 | 6/1963 | McEntyre et al. | 40—106.32 |
| 2,787,917 | 4/1957 | Schroeder | 40—106.32 |

LAWRENCE CHARLES, *Primary Examiner.*